US012600316B2

(12) United States Patent
Kawanaka et al.

(10) Patent No.: US 12,600,316 B2
(45) Date of Patent: Apr. 14, 2026

(54) GAS GENERATOR

(71) Applicant: Daicel Corporation, Osaka (JP)

(72) Inventors: Yuichiro Kawanaka, Tokyo (JP); Shogo Komori, Tokyo (JP); Nobuhiko Yagi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/961,489

(22) Filed: Nov. 27, 2024

(65) Prior Publication Data

US 2025/0091544 A1 Mar. 20, 2025

Related U.S. Application Data

(63) Continuation of application No. PCT/JP2023/020442, filed on Jun. 1, 2023.

(30) Foreign Application Priority Data

Jun. 6, 2022 (JP) ................................. 2022-091414

(51) Int. Cl.
*B60R 21/264* (2006.01)
(52) U.S. Cl.
CPC .... *B60R 21/264* (2013.01); *B60R 2021/2648* (2013.01)
(58) Field of Classification Search
CPC .. B60R 2021/26076; B60R 2021/2648; B60R 21/2644; B60R 21/264
See application file for complete search history.

(56) References Cited

U.S. PATENT DOCUMENTS

| | | | | |
|---|---|---|---|---|
| 5,615,912 A | * | 4/1997 | O'Loughlin | .......... B60R 21/272 |
| | | | | 137/68.13 |
| 9,321,426 B1 | * | 4/2016 | Krupp | ...................... C06D 5/00 |
| 11,718,267 B1 | * | 8/2023 | Wayment | ................ F42B 3/195 |
| | | | | 280/741 |

(Continued)

FOREIGN PATENT DOCUMENTS

| | | | | |
|---|---|---|---|---|
| DE | 102013110810 A1 | | 4/2015 | |
| DE | 102013211218 B4 | * | 8/2021 | ............. B60R 21/26 |

(Continued)

OTHER PUBLICATIONS

International Search Report and Written Opinion mailed on Aug. 15, 2023, received for PCT Application PCT/JP2023/020442, filed on Jun. 1, 2023, 15 pages including English Translation.

*Primary Examiner* — Nicole T Verley
(74) *Attorney, Agent, or Firm* — XSENSUS LLP

(57) ABSTRACT

A gas generator includes a housing and an igniter assembly defining, together with the housing, an accommodating space in which a gas source is stored. The igniter assembly includes an igniter, a collar member, a resin member integrally joining the igniter and the collar member, and a cover member made of metal, surrounding an ignition portion and the resin member in a manner that the igniter and the resin member are sealed with respect to the accommodating space, and configured to be ruptured when the igniter is actuated. The cover member is welded to the collar member over an entire circumference while straddling a boundary line between the resin member and the collar member.

13 Claims, 9 Drawing Sheets

(56) References Cited

U.S. PATENT DOCUMENTS

| | | | | |
|---|---|---|---|---|
| 2005/0161922 A1* | 7/2005 | Bilbrey | ................. | B60R 21/272 |
| | | | | 280/736 |
| 2005/0189754 A1 | 9/2005 | Matsuda et al. | | |
| 2010/0181748 A1 | 7/2010 | Nakamura et al. | | |
| 2011/0018243 A1 | 1/2011 | Yano et al. | | |
| 2012/0234839 A1 | 9/2012 | Smith et al. | | |
| 2014/0239623 A1* | 8/2014 | Tokuda | ................. | B60R 21/272 |
| | | | | 280/737 |
| 2015/0107477 A1* | 4/2015 | Heigl | ........................ | F42B 3/10 |
| | | | | 156/60 |
| 2016/0167618 A1 | 6/2016 | Jordan et al. | | |
| 2019/0351863 A1* | 11/2019 | Ramp | ................. | B60R 21/2646 |

FOREIGN PATENT DOCUMENTS

| | | | | | |
|---|---|---|---|---|---|
| EP | 0776796 A2 * | 6/1997 | ......... | B60R 21/2644 |
| EP | 4406788 A1 * | 7/2024 | ................ | F42B 3/04 |
| FR | 2901523 A1 * | 11/2007 | ......... | B60R 21/2644 |
| JP | 2005225346 A | 8/2005 | | |
| JP | 2022165390 A * | 10/2022 | ......... | B60R 21/2644 |
| WO | WO-2007101644 A1 * | 9/2007 | ........... | B60R 21/264 |
| WO | 2008153097 A1 | 12/2008 | | |
| WO | WO-2016013630 A1 * | 1/2016 | ......... | B60R 21/2646 |
| WO | WO-2017138612 A1 * | 8/2017 | ............. | F42B 3/103 |
| WO | WO-2020179113 A1 * | 9/2020 | ......... | B60R 21/2644 |
| WO | WO-2021075376 A1 * | 4/2021 | ........... | B60R 21/263 |
| WO | WO-2021245967 A1 * | 12/2021 | ......... | B60R 21/2644 |
| WO | WO-2022209798 A1 * | 10/2022 | ........... | B60R 21/264 |
| WO | WO-2023100407 A1 * | 6/2023 | ................ | F42B 3/04 |
| WO | WO-2023100408 A1 * | 6/2023 | ............. | F42B 3/103 |
| WO | WO-2023233907 A1 * | 12/2023 | ................ | F42B 3/04 |

* cited by examiner

GAS GENERATOR

CROSS-REFERENCE TO RELATED APPLICATIONS

The present application is a Continuation of International Patent Application No. PCT/JP2023/020442 filed on Jun. 1, 2023, which contains subject matter related to Japanese Patent Application No. 2022-091414 filed in the Japan Patent Office on Jun. 6, 2022, the entire contents of each are incorporated herein by reference.

TECHNICAL FIELD

The present invention relates to a gas generator.

BACKGROUND ART

A typical gas generator is widely known in which a gas source is stored in an accommodating space formed in a housing and gas is released to the outside by actuating an igniter (for example, Patent Document 1). This type of gas generator is used, for example, to supply gas to an airbag or a seat belt retractor. An electric igniter that is actuated mainly by an ignition current is known as an igniter used in a gas generator. In a gas generator using an electric igniter, a structure is generally adopted in which the electric igniter and a metal collar member are integrally joined via a resin member to form an igniter assembly and the igniter assembly is mounted in a mounting hole formed in a housing.

CITATION LIST

Patent Document

Patent Document 1: US 2012/234839 A
Patent Document 2: DE 102013110810 A1

SUMMARY OF INVENTION

Technical Problem

Here, from the viewpoint of stabilizing performance of the gas generator, it is preferable that the accommodating space in which the gas source is stored is airtightly maintained with respect to the outside. However, in the typical gas generator, moisture may get into the accommodating space through the boundary portion between the collar member and the resin member, or the gas source may leak to the outside of the accommodating space through the boundary portion.

The technique of the present disclosure has been made in view of the above problem, and an object thereof is to provide a technique that enables improved airtightness (sealing performance) of an accommodating space in which a gas source is stored in a gas generator.

Solution to Problem

To solve the above problem, the technique of the present disclosure adopts the following configuration. In other words, the technique of the present disclosure is a gas generator that includes a housing in which an igniter mounting hole is formed; and an igniter assembly attached to the housing in a manner that the igniter assembly closes the igniter mounting hole, the igniter assembly defining, together with the housing, an accommodating space in which a gas source is stored. The igniter assembly includes: an igniter including an ignition portion provided with an ignition chamber in which an ignition charge is stored and a conductive portion to which an ignition current for igniting the ignition charge is supplied, the igniter being disposed in a manner that the ignition portion is located on an inner side of the accommodating space with respect to the conductive portion, the igniter being configured to be actuated by the ignition current supplied to the conductive portion and thus rupture the ignition portion and release a combustion product of the ignition charge; a collar member made of metal, formed in a cylindrical shape, and inserted into the igniter mounting hole in a manner that the collar member surrounds the igniter; a resin member made of resin and disposed between the igniter and the collar member, the resin member integrally joining the igniter and the collar member in a state where at least the conductive portion is exposed from the resin member; and a cover member made of metal, the cover member surrounding the ignition portion and the resin member in a manner that the igniter and the resin member are sealed with respect to the accommodating space, the cover member being configured to be ruptured when the igniter is actuated. The cover member is welded to the collar member over an entire circumference while straddling a boundary line between the resin member and the collar member.

In the gas generator according to the present disclosure, a gas generating agent and pressurized gas each as the gas source may be stored in the accommodating space.

In the gas generator according to the present disclosure, the cover member may be formed in a manner that a space is ensured between the cover member and a rupturable portion being a portion rupturable in the ignition portion.

In the gas generator according to the present disclosure, the ignition portion may include a cup body that includes a peripheral wall portion having a cylindrical shape and a lid wall portion closing one end portion of the peripheral wall portion and formed as the rupturable portion; and a closing member disposed closing an opening that is formed in the other end portion of the peripheral wall portion and defining the ignition chamber together with the cup body, the ignition portion being configured to release the combustion product of the ignition charge to the outside of the ignition chamber by rupture of the lid wall portion when the igniter is actuated. The cover member may include a peripheral wall facing portion having a cylindrical shape, the peripheral wall facing portion being disposed in a state of facing the peripheral wall portion and being in contact with the peripheral wall portion, and a lid wall facing portion having a dome shape and formed facing the lid wall portion and protruding toward the accommodating space.

In the gas generator according to the present disclosure, the ignition portion may include a cup body that includes a peripheral wall portion having a cylindrical shape and a lid wall portion closing one end portion of the peripheral wall portion and formed as the rupturable portion; and a closing member disposed closing an opening that is formed in the other end portion of the peripheral wall portion and defining the ignition chamber together with the cup body, the ignition portion being configured to release the combustion product of the ignition charge by rupture of the lid wall portion when the igniter is actuated. The ignition portion may further include a charge holder having a cylindrical shape and disposed in the ignition chamber in a manner that the charge holder surrounds the ignition charge while facing the peripheral wall portion and being in contact with the peripheral wall portion.

In the gas generator according to the present disclosure, the ignition portion may include a cup body that includes a peripheral wall portion having a cylindrical shape and a lid wall portion closing one end portion of the peripheral wall portion and formed as the rupturable portion; and a closing member disposed closing an opening that is formed in the other end portion of the peripheral wall portion and defining the ignition chamber together with the cup body, the ignition portion being configured to release the combustion product of the ignition charge by rupture of the lid wall portion when the igniter is actuated. When the lid wall portion is ruptured in a manner that the combustion product is intensively emitted to the cover member, the cover member may be ruptured.

In the gas generator according to the present disclosure, the ignition portion may include a cup body that includes a peripheral wall portion having a cylindrical shape and a lid wall portion closing one end portion of the peripheral wall portion and formed as the rupturable portion; and a closing member disposed closing an opening that is formed in the other end portion of the peripheral wall portion and defining the ignition chamber together with the cup body, the ignition portion being configured to release the combustion product of the ignition charge by rupture of the lid wall portion when the igniter is actuated. When the lid wall portion is ruptured and thus comes into contact with the cover member, the cover member may be ruptured.

In the gas generator according to the present disclosure, the collar member may be welded to the housing over an entire circumference.

Advantageous Effects of Invention

According to the present disclosure, in the gas generator, airtightness of the accommodating space in which the gas source is stored can be improved.

BRIEF DESCRIPTION OF DRAWINGS

FIG. 2 is a cross-sectional view illustrating a state of a portion near an igniter assembly before actuation of the gas generator according to the first embodiment.

FIG. 4 is a cross-sectional view illustrating a state of a portion near the igniter assembly when the gas generator according to the first embodiment is actuated and an ignition portion is ruptured.

DESCRIPTION OF EMBODIMENTS

Embodiments according to the present disclosure will be described below with reference to the accompanying drawings. In the embodiments described below, a mode in which the technique according to the present disclosure is applied to an airbag gas generator (inflator) will be described. However, the application of the technique according to the present disclosure is not limited thereto. For example, the technique may be applied to a gas generator for a seat belt retractor. Note that the respective configurations and the combinations thereof in the respective embodiments are merely examples, and additions, omissions, substitutions, and other changes to the configurations can be made as appropriate without departing from the gist of the present invention. The present disclosure is not limited by the embodiments, but only limited by the claims. In the present specification, "entire circumference welding" refers to welding in an annular shape continuous in the circumferential direction, and refers to a state where a gap generated between two members to be welded is closed.

First Embodiment

Figure 1:
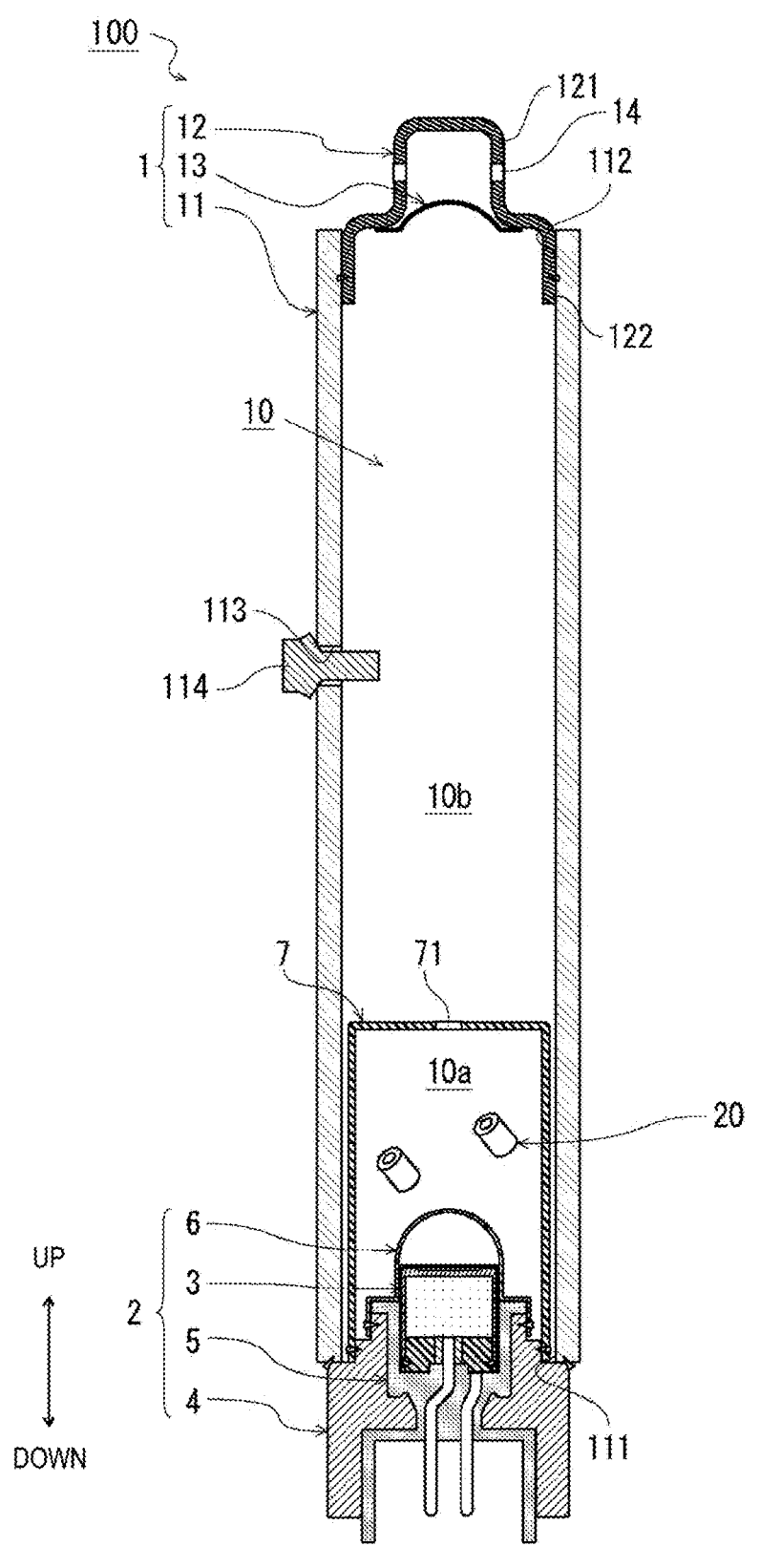
FIG. 1 is a cross-sectional view illustrating a state before actuation of a gas generator according to a first embodiment.

FIG. 1 is a cross-sectional view illustrating a state before actuation of an airbag gas generator (hereinafter, simply referred to as a gas generator) 100 according to a first embodiment. FIG. 1 illustrates a cross-section along an axial direction of a housing indicated by reference sign 1. The gas generator 100 according to the present embodiment is configured as a so-called single gas generator including one igniter. The gas generator 100 is also configured as a so-called hybrid gas generator using a gas generating agent and pressurized gas as gas sources. However, the technique according to the present disclosure is not limited to such a configuration. In other words, the gas generator according to the present disclosure may include a plurality of igniters. Also, the gas generator according to the present disclosure may be configured as a so-called pyrotechnic gas generator using only a gas generating agent as a gas source, or may be configured as a so-called stored gas generator using only pressurized gas as a gas source.

Overall Configuration

As illustrated in FIG. 1, the gas generator 100 includes a cylindrical housing 1 in which an igniter mounting hole 111 is formed, and an igniter assembly 2 attached to the housing 1 to close the igniter mounting hole 111. An accommodating space 10 is defined by the housing 1 and the igniter assembly 2. A gas generating agent 20 and pressurized gas as gas sources are stored in the accommodating space 10. The gas generator 100 further includes a holder 7 disposed in the accommodating space 10 in a manner that the holder 7 surrounds the igniter assembly 2 and the gas generating agent 20. Here, a direction along the axial direction of the housing 1 is defined as a vertical direction of the gas generator 100, where the igniter assembly 2 side (i.e., the lower side in FIG. 1) is defined as a lower side of the gas generator 100, and the opposite side thereof (i.e., the upper side in FIG. 1, the diffuser portion side indicated by reference sign 12) is defined as an upper side of the gas generator 100.

The gas generator 100 is, for example, an airbag inflator, and is a device that supplies an airbag (not illustrated) with an operating gas that inflates the airbag at the time of actuation. The gas generator 100 burns the gas generating agent 20 filled in the accommodating space 10 by actuating an igniter 3 included in the igniter assembly 2, and inflates the airbag (not illustrated) by releasing the combustion gas, which is a combustion product of the gas generating agent 20, together with pressurized gas to the outside of the housing 1. Hereinafter, components of the gas generator 100 will be described.

Housing

As illustrated in FIG. 1, the housing 1 includes a housing body portion 11 made of metal, a diffuser portion 12, and a rupturable plate 13. The housing body portion 11 is formed in a cylindrical shape with both opened end portions. An opening at one end portion (a lower end portion) of the housing body portion 11 is formed as the igniter mounting hole 111 for mounting the igniter assembly 2. An opening at the other end portion (an upper end portion) of the housing body portion 11 is formed as a diffuser mounting hole 112 for mounting the diffuser portion 12. A filling hole 113 that allows for communication between the inside and the outside of the housing 1 is formed in a side surface of the housing body portion 11. The filling hole 113 is closed by a closing pin 114 in a state where the accommodating space 10 is filled with the pressurized gas through the filling hole 113.

As illustrated in FIG. 1, the diffuser portion 12 is formed in a bottomed cylindrical shape with a step. Specifically, the diffuser portion 12 includes a gas discharge portion 121 including a closed end portion thereof and a fitting portion 122 including an open end portion thereof and having a diameter larger than that of the gas discharge portion 121. A gas discharge port 14 that allows for communication between the inside and the outside of the diffuser portion 12 is formed in a peripheral wall of the gas discharge portion 121. The fitting portion 122 and an inner wall of the diffuser mounting hole 112 are welded to each other over the entire circumference in a state where the fitting portion 122 is fitted into the diffuser mounting hole 112 of the housing body portion 11 and the gas discharge portion 121 protrudes to the outside of the diffuser mounting hole 112, and thus the diffuser portion 12 is joined to the housing body portion 11.

As illustrated in FIG. 1, the rupturable plate 13 is a plate-like member that separates an internal space of the housing body portion 11 and an internal space of the diffuser portion 12. Since the internal space of the housing body portion 11 and the internal space of the diffuser portion 12 are separated by the rupturable plate 13, the internal space of the diffuser portion 12 is maintained at normal pressure. A peripheral edge portion of the rupturable plate 13 is welded to the stepped surface of the diffuser portion 12 over the entire circumference, and thus the rupturable plate 13 is joined to the diffuser portion 12.

Accommodating Space

The accommodating space 10 is formed as a space surrounded by the housing body portion 11 and the rupturable plate 13 of the housing 1 and the igniter assembly 2. The gas generating agent 20 stored in the accommodating space 10 is burned by operation of the igniter 3 to generate combustion gas. For example, a solid gas generating agent having a relatively low combustion temperature is used as the gas generating agent 20. The combustion temperature of the gas generating agent 20 is, for example, 1000° C. to 1700° C. As the gas generating agent 20, for example, a single-perforated cylindrical one composed of guanidine nitrate (41 wt. %), basic copper nitrate (49 wt. %), and a binder or an additive can be used. As the pressurized gas stored in the accommodating space 10, for example, inert gas alone such as argon or helium, or pressurized gas composed of a mixture of these is used. However, the gas generating agent 20 and the pressurized gas are not limited to those described above.

As illustrated in FIG. 1, the holder 7 for holding the gas generating agent 20 at a location near the igniter assembly 2 is disposed in the accommodating space 10. The holder 7 is a bottomed cylindrical member that extends in the vertical direction and has a closed upper end portion, and is disposed surrounding the igniter assembly 2 mounted in the igniter mounting hole 111. Thus, the accommodating space 10 is divided into a combustion chamber 10a inside the holder 7 and a pressurized gas chamber 10b outside the holder 7. The gas generating agent 20 is disposed in the combustion chamber 10a formed around the igniter assembly 2. A communication hole 71 having a size small enough for the gas generating agent 20 not to pass is formed in the holder 7, and the combustion chamber 10a and the pressurized gas chamber 10b are in communication with each other through the communication hole 71. Therefore, the pressurized gas is present in both the combustion chamber 10a and the pressurized gas chamber 10b. In other words, the entire accommodating space 10 including the combustion chamber 10a and the pressurized gas chamber 10b is filled with the pressurized gas, and the accommodating space 10 is entirely in a pressurized state.

Igniter Assembly

Figure 2:
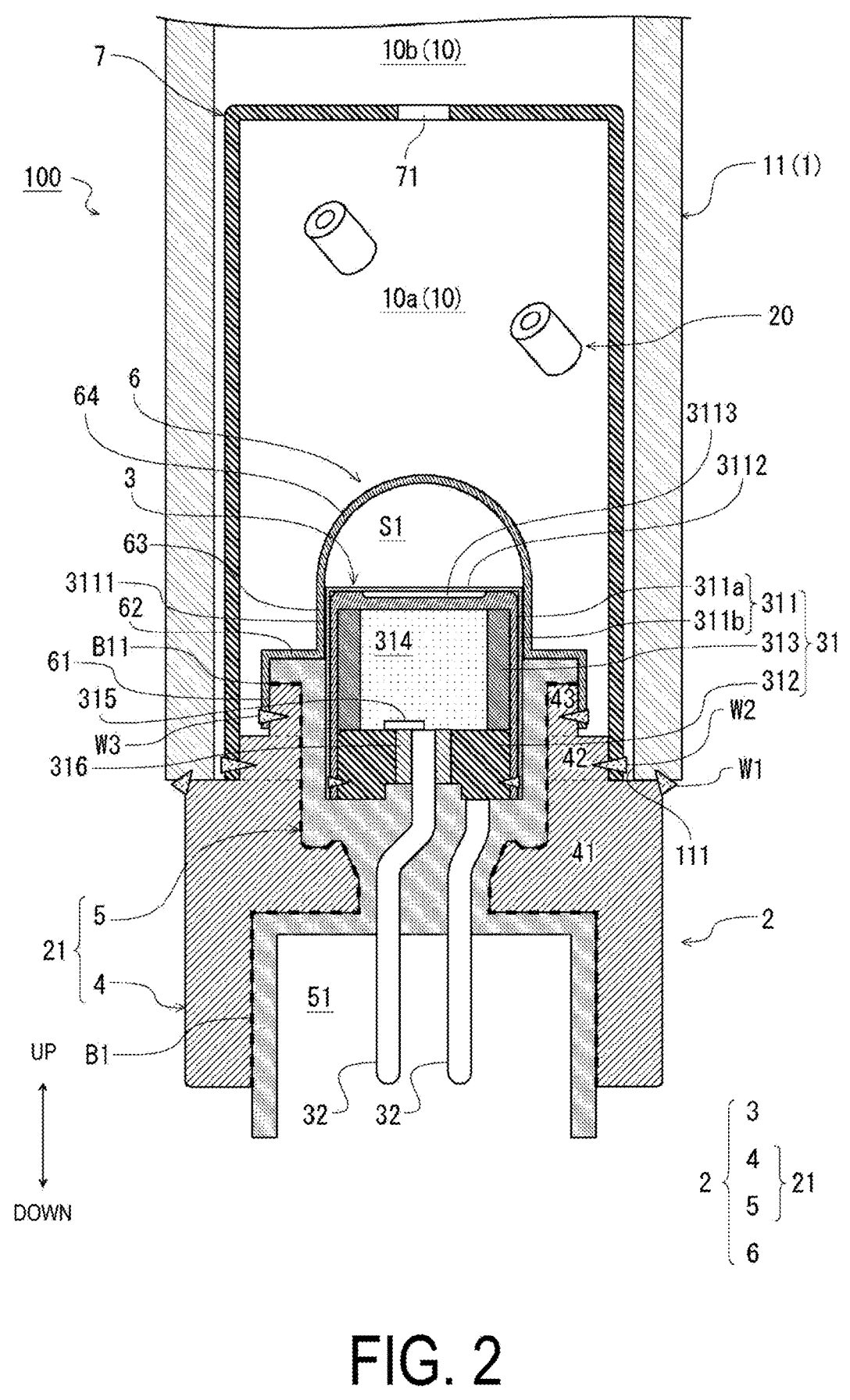

FIG. 2 is a cross-sectional view illustrating a state of a portion near the igniter assembly 2 before actuation of the gas generator 100 according to the first embodiment. As illustrated in FIG. 2, the igniter assembly 2 includes the igniter 3, a collar member 4, a resin member 5, and a cover member 6 made of metal.

Igniter

As illustrated in FIG. 2, the igniter 3 includes an ignition portion 31 and a pair of electro-conductive pins 32, 32. An ignition chamber 314 in which an ignition charge is stored is formed in the ignition portion 31. An ignition current for igniting the ignition charge stored in the ignition chamber 314 is supplied to the pair of electro-conductive pins 32, 32. The pair of electro-conductive pins 32, 32 is an example of a "conductive portion" according to the present disclosure. The igniter 3 is configured as an electric igniter. Specifically, when the igniter 3 is actuated by the ignition current supplied to the pair of electro-conductive pins 32, 32, the ignition portion 31 is ruptured, and the combustion product of the ignition charge is released. As illustrated in FIG. 2, the igniter 3 is disposed in a manner that the ignition portion 31 is located on an inner side of the accommodating space 10 (closer to the accommodating space 10) with respect to the pair of electro-conductive pins 32, 32.

As illustrated in FIG. 2, the ignition portion 31 includes a cup body 311, a metal header 312 (an example of a "closing member" according to the present disclosure), and a charge holder 313. The cup body 311 is formed in a bottomed cylindrical shape and has a double structure in which an outer cup 311b having insulation properties overlaps the outer side of an inner cup 311a made of metal. The material of the outer cup 311b is not particularly limited, but a resin material is exemplified. The outer cup 311b having insulation properties is interposed between the inner cup 311a and the cover member 6, and thus the current supplied to the housing 1 due to electric leakage or the like is prevented from flowing to the electro-conductive pins 32 via the cover member 6, the inner cup 311a, and the metal header 312 (that is, accidental ignition of the gas generator 100 is prevented). The cup body 311 is formed including a cylindrical peripheral wall portion 3111 and a lid wall portion 3112 closing one end portion (an upper end) of the peripheral wall portion 3111. The lid wall portion 3112 is an example of a "rupturable portion" according to the present disclosure. The metal header 312 is a metal member formed in a columnar shape, and is disposed inside the cup body 311 in a manner that the metal header 312 closes an opening formed in the other end portion (a lower end portion) of the peripheral wall portion 3111. An outer peripheral surface of the metal header 312 is welded to an inner wall of the peripheral wall portion 3111 over the entire circumference. As illustrated in FIG. 2, the ignition chamber 314 in which an ignition charge is stored is defined by the cup body 311 and the metal header 312. The charge holder 313 is formed in a cylindrical shape. The charge holder 313 is disposed in the ignition chamber 314 in a manner that the charge holder 313 surrounds the ignition charge while facing the peripheral wall portion 3111 of the cup body 311 and being in contact with the peripheral wall portion 3111. By providing the charge holder 313, for example, the ignition charge can be easily loaded by pressure into the metal header 312. In addition, a contact state between the ignition charge and a bridge wire 315 described below can be prevented from being changed by pressure from the outside after the igniter 3 is assembled.

The pair of electro-conductive pins 32, 32 extend downward from the ignition portion 31. One of the pair of electro-conductive pins 32, 32 is joined to the metal header 312 via an insulator 316 while being inserted into a through hole of the metal header 312. The other of the pair of the electro-conductive pins 32, 32 is joined to a lower surface of the metal header 312. A connector (not illustrated) via which power from an external power source is supplied is connected to the pair of electro-conductive pins 32, 32.

The igniter 3 is actuated by power supplied to the pair of electro-conductive pins 32, 32 via the connector. Here, the bridge wire 315 that is a resistor that electrically connects the one electro-conductive pin 32 with the metal header 312 is wired to a bottom portion of the ignition chamber 314. The power is supplied to the pair of electro-conductive pins 32, 32, and thus a current flows through the bridge wire 315, and the ignition charge in the ignition chamber 314 is burned by Joule heat generated in the bridge wire 315. Accordingly, the pressure in the ignition chamber 314 increases to allow the lid wall portion 3112 of the cup body 311 to be ruptured, and thus the combustion product of the ignition charge is released to the outside of the ignition chamber 314.

Figure 3:
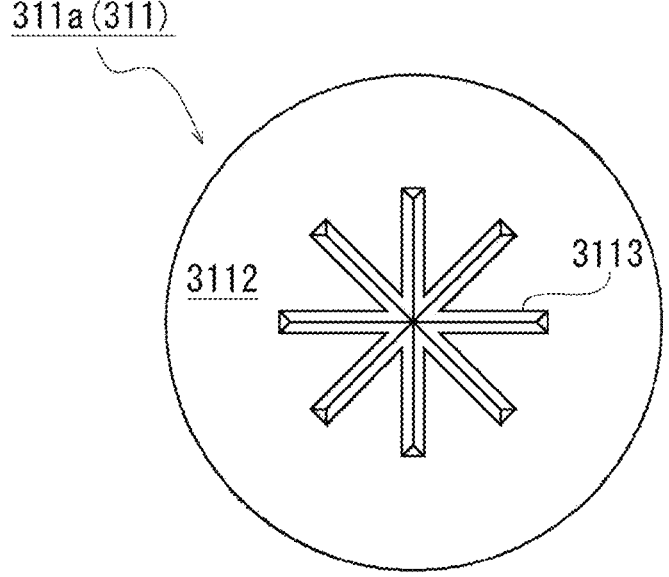
FIG. 3 is a top view of an inner cup of a cup body according to the first embodiment.

FIG. 3 is a top view of the inner cup 311a of the cup body 311 according to the first embodiment. FIG. 3 illustrates an upper end surface (a closed end surface) of the inner cup 311a constituting the lid wall portion 3112 of the cup body 311. As illustrated in FIG. 3, a plurality of grooves 3113 extending radially from the central portion are formed on the upper end surface of the inner cup 311a. The plurality of grooves 3113 extend radially from the central portion of the upper end surface of the inner cup 311a. As illustrated in FIG. 3, eight grooves 3113 are formed at equal angular intervals in this example. However, the technique according to the present disclosure is not limited to such a configuration. Since a portion of an upper end portion of the inner cup 311a where the groove 3113 is formed is thinner than other portions, the portion is more fragile than the other portions and is more easily broken than the other portions. Therefore, the lid wall portion 3112 is easily ruptured when the igniter 3 is actuated.

Collar Member

As illustrated in FIG. 2, the collar member 4 is a metallic cylindrical member that is disposed surrounding the igniter 3 and supports the igniter 3 via the resin member 5. The collar member 4 includes a first portion 41 including a lower end portion of the collar member 4, a second portion 42 connected to an upper end portion of the first portion 41 and having an outer diameter smaller than that of the first portion 41, and a third portion 43 connected to an upper end portion of the second portion 42, including an upper end portion of the collar member 4, and having an outer diameter smaller than that of the second portion 42. Thus, steps are formed on the outer periphery of the collar member 4.

As illustrated in FIG. 2, in a state where the second portion 42 and the third portion 43 of the collar member 4 are inserted into the igniter mounting hole 111 of the housing 1, an upper end surface of the first portion 41 and a lower end surface of the housing body portion 11 are welded to each other over the entire circumference, and thus, the collar member 4 is joined to the housing 1. Reference sign W1 in FIG. 2 denotes a welded portion between the collar member 4 and the housing 1. As described above, the collar member 4 is welded to the housing 1 continuously over the entire circumference (i.e., entire circumference welding) in a state where the igniter assembly 2 is inserted into the igniter mounting hole 111 in a manner that the igniter assembly 2 closes the igniter mounting hole 111, and thus, the igniter assembly 2 is attached to the housing 1. Additionally, in a state where the second portion 42 of the collar member 4 is fitted into an opening formed in a lower end portion of the holder 7, an outer peripheral surface of the second portion 42 and an inner peripheral surface of the holder 7 are welded to each other over the entire circumference, and thus, the holder 7 is joined to the igniter assembly 2. Reference sign W2 in FIG. 2 denotes a welded portion between the collar member 4 and the holder 7.

Resin Member

As illustrated in FIG. 2, the resin member 5 is a resin member that is disposed between the igniter 3 and the collar member 4 and via which the igniter 3 and the collar member 4 are integrally joined to each other. The resin member 5 is disposed filling an annular gap formed between the igniter 3 and the collar member 4. In this case, the resin member 5 covers the igniter 3 in a manner that the lid wall portion 3112 as a rupturable portion in the ignition portion 31, a portion of the peripheral wall portion 3111, and distal end portions of the pair of electro-conductive pins 32, 32 are exposed from the resin member 5. The resin member 5 covers an inner peripheral surface of the collar member 4 in a manner that a connector insertion space 51 into which a power supply connector can be inserted is formed inside the collar member 4. In this example, the resin member 5 covers an upper end surface of the third portion 43 in a manner that an outer peripheral surface of the resin member 5 is flush with an outer peripheral surface of the third portion 43 of the collar member 4.

Boundary Portion

Here, in FIG. 2, a dotted line indicated by reference sign B1 represents a boundary portion, which is a portion where the collar member 4 and the resin member 5 are joined to each other. The boundary portion B1 is formed by joint surfaces of the collar member 4 and the resin member 5. As illustrated in FIG. 2, the boundary portion B1 extends from the outside to the inside of the housing 1. Here, a member in which the collar member 4 and the resin member 5 are integrated is referred to as a joined body 21. In this case, an end portion of the boundary portion B1 appears as a boundary line between the collar member 4 and the resin member 5 on the surface of the joined body 21. In FIG. 2, the boundary line between the collar member 4 and the resin member 5, which appears inside the housing 1 is indicated by reference sign B11. The boundary line B11 is located on an outer peripheral surface of the joined body 21.

Cover Member

The cover member 6 is a metal member that surrounds the ignition portion 31 and the resin member 5 in a manner that the igniter 3 and the resin member 5 are sealed with respect to the accommodating space 10 before the igniter 3 is actuated and is configured to be ruptured when the igniter 3 is actuated. The metal material forming the cover member 6 is not particularly limited, but stainless steel, aluminum, iron, and the like are exemplified. As illustrated in FIG. 2, the cover member 6 is formed substantially in a bottomed cylindrical shape, and includes an axially extending portion 61, a radially extending portion 62, a peripheral wall facing portion 63, and a lid wall facing portion 64.

The axially extending portion 61 is formed in a cylindrical shape extending in the vertical direction. The axially extending portion 61 covers the outer peripheral surface of the third portion 43 of the collar member 4 and the outer peripheral surface of the resin member 5 in a manner that the axially extending portion 61 straddles the boundary line B11 between the collar member 4 and the resin member 5, and is welded to the outer peripheral surface of the third portion 43 over the entire circumference. Reference sign W3 in FIG. 2 denotes a welded portion between the cover member 6 and the collar member 4. The cover member 6 and the collar member 4 are continuously welded to each other over the entire circumference at a position exposed to the accommodating space 10, and the welded portion W3 is exposed to the pressurized gas. Therefore, the end portion of the boundary portion B1 between the collar member 4 and the resin member 5 is not exposed to the accommodating space 10 and is not in communication with the accommodating space 10. The radially extending portion 62 extends radially inward from an upper end portion of the axially extending portion 61 and covers an upper end surface of the resin member 5. The peripheral wall facing portion 63 is formed in a cylindrical shape extending upward from an inner end portion of the radially extending portion 62, and covers an outer peripheral surface of the peripheral wall portion 3111 of the cup body 311. In other words, the peripheral wall facing portion 63 is disposed in a state of facing the peripheral wall portion 3111 of the cup body 311 and being in contact with the peripheral wall portion 3111. Note that the peripheral wall facing portion 63 does not need to be in contact with the peripheral wall portion 3111 over the entire circumference, and a portion of the peripheral wall facing portion 63 may be in contact with the peripheral wall portion 3111 in the circumferential direction. The lid wall facing portion 64 closes an upper end portion of the peripheral wall facing portion 63 before the gas generator 100 is actuated, and is formed in a dome shape (hemispherical shape) protruding upward (toward the accommodating space 10). The lid wall facing portion 64 faces the lid wall portion 3112 of the cup body 311 and forms a predetermined space S1 between the lid wall portion 3112 and the lid wall facing portion 64. The lid wall facing portion 64 is formed with a uniform thickness as a whole.

When the igniter 3 is actuated, the lid wall facing portion 64 is ruptured by pressure of the combustion product of the ignition charge released from the ignition portion 31 to the predetermined space S1, and thus the cover member 6 is opened. A groove for promoting suitable rupture of the lid wall facing portion 64 may be formed in the lid wall facing portion 64. The groove may be, for example, a groove radially extending from the top portion of the lid wall facing portion 64. Note that the cover member 6 itself does not need to be ruptured. Although a hole is not formed in the cover member 6 according to the present embodiment, for example, a through hole may be formed in the cover member 6, and the through hole may be closed by a closing member to form a sealed state. In this case, when the igniter 3 is actuated, the closing member is ruptured by pressure of the combustion product and thus the cover member 6 may be opened.

As illustrated in FIG. 2, the cover member 6 is welded to the collar member 4 over the entire circumference, and thus the igniter 3, the resin member 5, and the predetermined space S1 that are surrounded by the cover member 6 are sealed with respect to the accommodating space 10 before the igniter 3 is actuated. Therefore, the predetermined space S1 is maintained at ordinary pressure. Further, the cover member 6 is welded to the collar member 4 over the entire circumference while straddling the boundary line B11 in a manner that the end portion of the boundary portion B1 between the resin member 5 and the collar member 4 is not exposed to the accommodating space 10. Accordingly, before the igniter 3 is actuated, the boundary portion B1 is sealed with respect to the accommodating space 10. Therefore, moisture is prevented from getting into the accommodating space 10 from the outside of the gas generator 100 through the boundary portion B1, and the pressurized gas is prevented from leaking from the accommodating space 10 to the outside of the gas generator 100 through the boundary portion B1. In other words, fluid (moisture or gas) is prevented from flowing into or out of the accommodating space 10 through the boundary portion B1. Furthermore, since the igniter 3 and the resin member 5 are also sealed with respect to the accommodating space 10 as described above, inflow and outflow of the fluid through the boundary portion between the igniter 3 and the resin member 5 are also prevented. For example, when the igniter 3 and the collar member 4 are integrated with each other by the resin member 5 formed by injection molding, a gap may be generated at the boundary portion B1 between the resin member 5 and the collar member 4 or at the boundary portion between the igniter 3 and the resin member 5 due to shrinkage of the resin during curing. Even when such a gap is generated, the gas generator 100 can prevent the fluid from flowing into and out of the accommodating space 10 through the gap. In addition, in the gas generator 100 according to the present embodiment, the collar member 4 is welded to the housing 1 over the entire circumference, inflow and outflow of the fluid through the boundary portion between the housing 1 and the collar member 4 are also prevented. As a result, in the gas generator 100 according to the present embodiment, before the igniter 3 is actuated, the accommodating space 10 is airtightly maintained with respect to the outside of the gas generator 100.

When the accommodating space 10 is filled with the pressurized gas as in this example, the cover member 6 functions as a protector for protecting the igniter 3 from the influence of high pressure. If the ignition portion 31 of the igniter 3 is exposed to the pressurized gas without the cover member 6 present, the cup body 311 is deformed, and thus the contact state between the bridge wire 315 disposed in the ignition chamber 314 and the ignition charge may deteriorate. In such a case, the igniter 3 cannot obtain the desired ignition performance, or an external diagnostic circuit determines that an error has occurred and thus the igniter 3 may not be actuated. The gas generator 100 according to the present embodiment includes the cover member 6 and thus can prevent such a situation.

As will be described below, the predetermined space S1 is a space for facilitating rupture of the lid wall portion 3112 of the cup body 311 when the igniter 3 is actuated. In the gas generator 100 according to the present embodiment, the lid wall facing portion 64 of the cover member 6 for forming the predetermined space S1 between the lid wall portion 3112 and the lid wall facing portion 64 is formed in a rounded dome shape. Thus, strength (pressure resistance) against the pressurized gas is imparted to the lid wall facing portion 64. Therefore, the lid wall facing portion 64 can be prevented from being deformed by the pressurized gas before the igniter 3 is actuated. In addition, the thickness of the lid wall facing portion 64 can be reduced in a manner that the lid wall facing portion 64 is easily ruptured when the igniter 3 is actuated.

Here, when the ease of deformation by the pressurized gas is compared between portions of the cover member 6, the peripheral wall facing portion 63 formed in a cylindrical shape tends to be deformed more easily than other portions. On the other hand, in the gas generator 100 according to the present embodiment, the peripheral wall facing portion 63 is disposed in a state of facing the peripheral wall portion 3111 of the cup body 311 and being in contact with the peripheral wall portion 3111. Additionally, in the ignition chamber 314, the cylindrical charge holder 313 formed in a cylindrical shape is disposed in a state of facing the peripheral wall portion 3111 and being in contact with the peripheral wall portion 3111. Accordingly, the peripheral wall facing portion 63 of the cover member 6 is supported by the peripheral wall portion 3111 of the cup body 311 and the charge holder 313 with respect to the pressurized gas. As a result, the peripheral wall facing portion 63 can be prevented from being deformed by the pressurized gas before the igniter 3 is actuated.

As illustrated in FIG. 2, the cover member 6 is supported in contact with any one of the igniter 3, the collar member 4, and the resin member 5 at a portion other than the lid wall facing portion 64. Therefore, the cover member 6 can be more suitably prevented from being deformed by the pressurized gas before the igniter 3 is actuated.

In the technique according to the present disclosure, the lid wall facing portion of the cover member need not have a dome shape, and the lid wall facing portion may be in contact with the lid wall portion of the cup body. In other words, the lid wall facing portion may cover the lid wall portion in a manner that the entire cover member is in contact with any one of the igniter, the collar member, and the resin member, and a space need not be ensured between the lid wall portion and the cover member. In the technique according to the present disclosure, the peripheral wall facing portion of the cover member need not be in contact with the peripheral wall portion of the cup body. The cover member may be not in contact with the collar member except for a welded portion to the collar member. The peripheral wall facing portion 63 need not be present in the cover member 6, and the dome-shaped lid wall facing portion 64 may be connected to a radially inner end portion of the radially extending portion 62.

Operation

The operation of the gas generator 100 according to the first embodiment will be described below. In a state where the gas generator 100 before actuation illustrated in FIGS. 1 and 2 is attached to a vehicle, a connector (not illustrated) inserted into the connector insertion space 51 is connected to the pair of electro-conductive pins 32, 32 of the igniter 3, and power can be supplied to the igniter 3. In this state, when a sensor (not illustrated) mounted on an automobile detects an impact, power from an external power source (not illustrated) is supplied to the pair of electro-conductive pins 32, 32 via the connector, and thus the igniter 3 is actuated and the ignition charge in the ignition chamber 314 burns.

Figure 4:
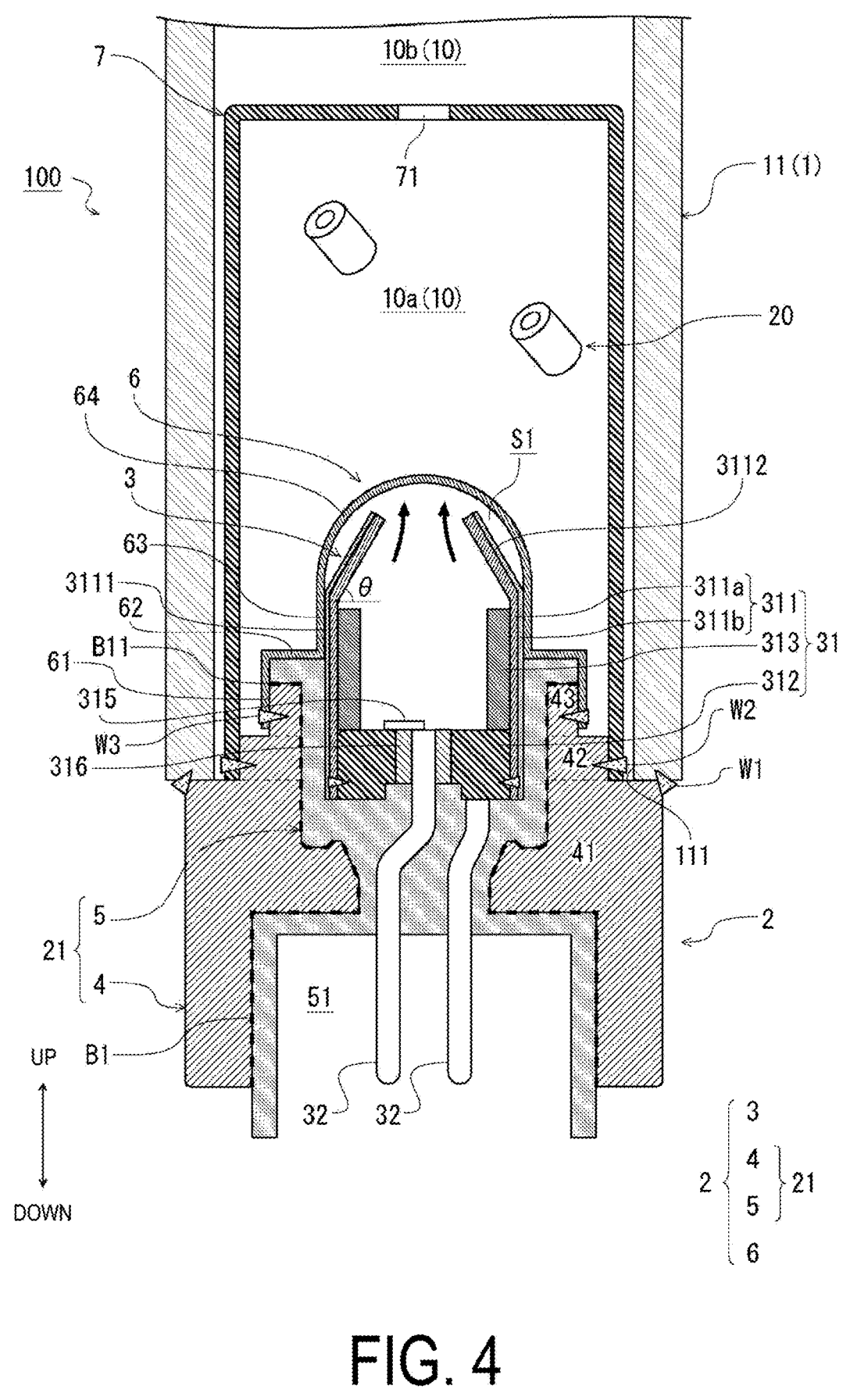

FIG. 4 is a cross-sectional view illustrating a state of a portion near the igniter assembly 2 when the gas generator 100 according to the first embodiment is actuated and the ignition portion 31 is ruptured. When the pressure in the ignition chamber 314 increases due to combustion of the ignition charge, the lid wall portion 3112 of the cup body 311 is ruptured as illustrated in FIG. 4, and the combustion product of the ignition charge is released from the ignition portion 31 to the predetermined space S1. In this case, the predetermined space S1 is ensured between the lid wall portion 3112 and the cover member 6, and thus the cover member 6 is prevented from disturbing the rupture of the lid wall portion 3112. As a result, the lid wall portion 3112 is easily ruptured.

When the pressure in the predetermined space S1 is increased by the combustion product released from the ignition portion 31, the lid wall facing portion 64 of the cover member 6 is ruptured, and the combustion product of the ignition charge is released to the combustion chamber 10a of the accommodating space 10. Here, as described above, the plurality of grooves 3113 extending radially from the central portion of the upper end surface of the inner cup 311a constituting the lid wall portion 3112 of the cup body 311 are formed in the upper end surface of the inner cup 311a. Therefore, the lid wall portion 3112 is ruptured from the central portion thereof into a petal shape. In this case, the flow of the combustion product released from the ignition portion 31 corresponds to a rupture angle θ of the ruptured piece of the lid wall portion 3112. For example, as illustrated in FIG. 4, the rupture angle θ can be defined as an angle of the ruptured piece with respect to a plane orthogonal to the axial direction of the peripheral wall portion 3111. In the gas generator 100 according to the present embodiment, the plurality of grooves 3113 are formed in a manner that the rupture angle θ of the ruptured piece of the lid wall portion 3112 is a predetermined value or less. Accordingly, as illustrated in FIG. 4, the combustion product of the ignition charge is intensively released to the cover member 6 (more specifically, the lid wall facing portion 64). As a result, the cover member 6 can be easily ruptured. In addition, in the gas generator 100 according to the present embodiment, the volume of the predetermined space S1 is set to a predetermined value or less in order to accelerate the pressure increase in the predetermined space S1. This also allows the cover member 6 to be easily ruptured.

Figure 5:
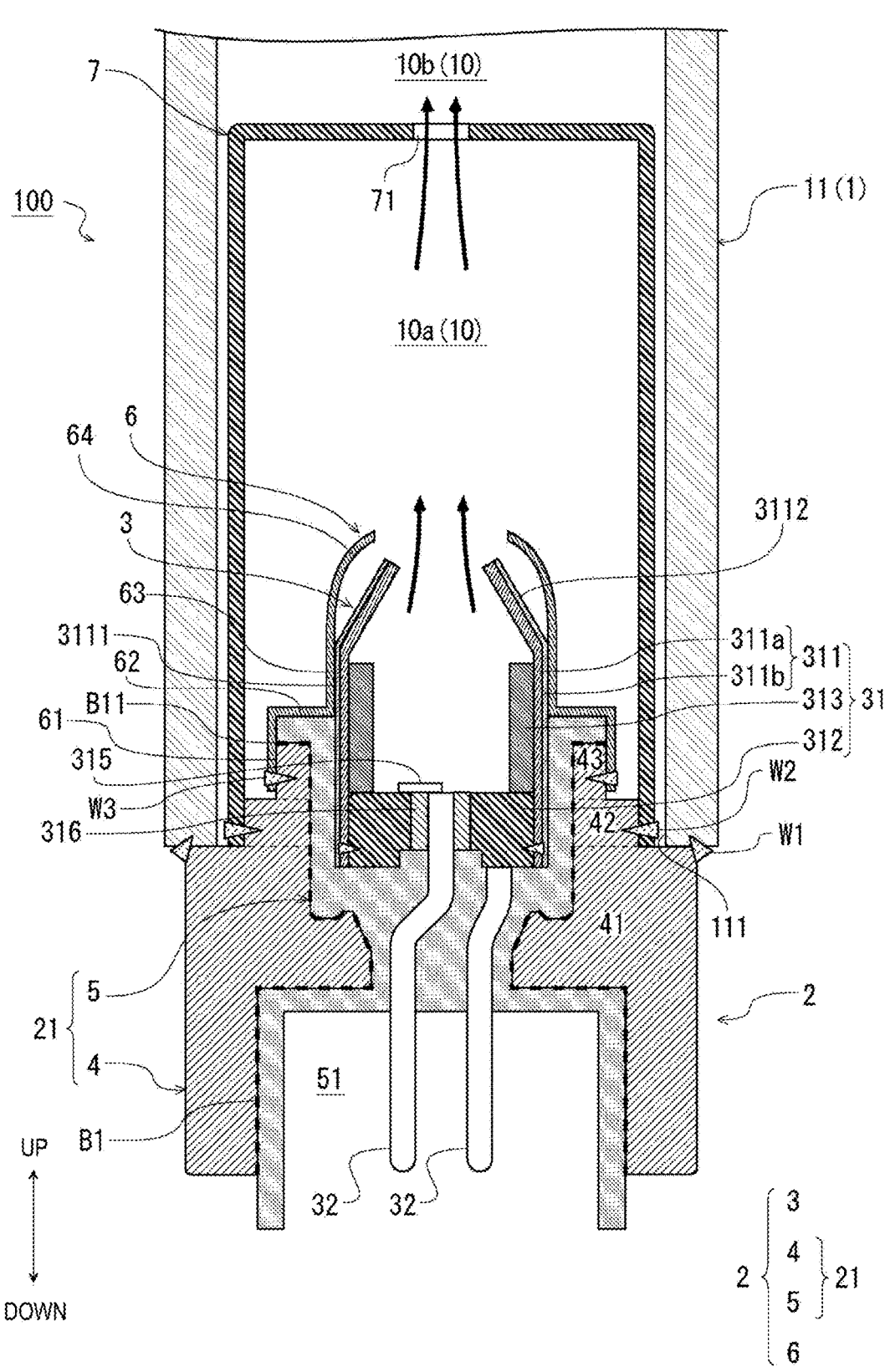
FIG. 5 is a cross-sectional view illustrating a state of a portion near the igniter assembly when the gas generator according to the first embodiment is actuated and a cover member is ruptured.

FIG. 5 is a cross-sectional view illustrating a state of a portion near the igniter assembly 2 when the gas generator 100 according to the first embodiment is actuated and the cover member 6 is ruptured. When the combustion product of the ignition charge is released to the combustion chamber 10a of the accommodating space 10, the gas generating agent 20 disposed in the combustion chamber 10a is ignited. The combustion gas of the gas generating agent 20 flows into the pressurized gas chamber 10b through the communication hole 71 formed in the holder 7. When the pressure in the accommodating space 10 increases due to the generation of the combustion gas, the rupturable plate 13 illustrated in FIG. 1 is broken. Thus, the combustion gas generated by the combustion of the gas generating agent and the pressurized gas stored in the accommodating space 10 are discharged from the gas discharge port 14 of the diffuser portion 12 to the outside of the gas generator 100. As a result, the airbag is inflated, and an occupant of the vehicle is protected from the impact.

Effects

As described above, the gas generator 100 according to the first embodiment includes the housing 1 in which the igniter mounting hole 111 is formed, and the igniter assembly 2 attached to the housing 1 in a manner that it closes the igniter mounting hole 111 and defining, together with the housing 1, the accommodating space 10 in which the gas source is stored. The igniter assembly 2 includes the igniter 3, the collar member 4 made of metal, the resin member 5 made of resin, and the cover member 6 made of metal. The igniter 3 includes the ignition portion 31 in which the ignition chamber 314 for accommodating the ignition charge is formed, and the pair of electro-conductive pins 32, 32 to which an ignition current for igniting the ignition charge is supplied. The igniter 3 is disposed in a manner that the ignition portion 31 is located on an inner side of the accommodating space 10 with respect to the pair of electro-conductive pins 32, 32. The igniter 3 is configured to be actuated by the ignition current supplied to the pair of electro-conductive pins 32, 32 and thus rupture the ignition portion 31 and release the combustion product of the ignition charge. The collar member 4 is formed in a cylindrical shape and is inserted into the igniter mounting hole 111 in a manner that it surrounds the igniter 3. The resin member 5 is disposed between the igniter 3 and the collar member 4, and the igniter 3 and the collar member 4 are integrally joined to each other via the resin member 5 in a state where the lid wall portion 3112 as a rupturable portion in the ignition portion 31 and the pair of electro-conductive pins 32, 32 are exposed from the resin member 5. The cover member 6 surrounds the ignition portion 31 and the resin member 5 in a manner that the igniter 3 and the resin member 5 are sealed with respect to the accommodating space 10 and is configured to be ruptured when the igniter 3 is actuated. The cover member 6 is welded to the collar member 4 over the entire circumference while straddling the boundary line B11 between the resin member 5 and the collar member 4. With the gas generator 100 according to the first embodiment configured as described above, the airtightness of the accommodating space 10 in which the gas source is stored can be improved.

In addition, the collar member 4 of the gas generator 100 according to the first embodiment is welded to the housing 1 over the entire circumference. Thus, the airtightness of the accommodating space 10 can be further improved.

The cover member 6 of the gas generator 100 according to the first embodiment is formed in a manner that the predetermined space S1 is ensured between the cover member 6 and the lid wall portion 3112 rupturable in the ignition portion 31. Therefore, the lid wall portion 3112 can be easily ruptured.

In the gas generator 100 according to the first embodiment, the gas generating agent 20 and the pressurized gas as gas sources are stored in the accommodating space 10. With the gas generator 100 in which the airtightness of the accommodating space 10 is improved as described above, the pressurized gas can be prevented from leaking to the outside of the gas generator 100.

The ignition portion 31 of the gas generator 100 according to the first embodiment includes the cup body 311 including the cylindrical peripheral wall portion 3111 and the lid wall portion 3112 closing one end portion of the peripheral wall portion 3111. The ignition portion 31 includes the metal header 312 that is disposed closing the opening formed at the other end portion of the peripheral wall portion 3111 and defines the ignition chamber 314 together with the cup body 311. The ignition portion 31 is configured in a manner that when the igniter 3 is actuated, the lid wall portion 3112 is ruptured and thus the combustion product of the ignition charge is released to the outside of the ignition chamber 314. The cover member 6 includes the cylindrical peripheral wall facing portion 63 disposed in a state of facing the peripheral wall portion 3111 of the cup body 311 and being in contact therewith, and the dome-shaped lid wall facing portion 64 formed facing the lid wall portion 3112 of the cup body 311 and protruding toward the accommodating space 10. Accordingly, the peripheral wall facing portion 63 is supported by the peripheral wall portion 3111 of the cup body 311 and the pressure resistance of the lid wall facing portion 64 is improved, and thus the cover member 6 can be prevented from being deformed by the pressurized gas before actuation of the igniter 3.

The ignition portion 31 of the gas generator 100 according to the first embodiment further includes the cylindrical charge holder 313 disposed in the ignition chamber 314 in a manner that it surrounds the ignition charge while facing the peripheral wall portion 3111 of the cup body 311 and being in contact therewith. Accordingly, the peripheral wall facing portion 63 of the cover member 6 is supported by the peripheral wall portion 3111 of the cup body 311 and the charge holder 313, and thus the peripheral wall facing portion 63 can be more suitably prevented from being deformed.

In the gas generator 100 according to the first embodiment, the lid wall portion 3112 of the ignition portion 31 is ruptured in a manner that the combustion product of the ignition charge is intensively released to the cover member 6 when the igniter 3 is actuated. As a result, the cover member 6 can be easily ruptured.

MODIFIED EXAMPLES

Gas generators according to modified examples of the first embodiment will be described below. In the explanation of the modified examples, differences from the gas generator 100 described with reference to FIGS. 1 to 5 will be mainly described, and detailed descriptions of points similar to those of the gas generator 100 will be omitted.

First Modified Example

Figure 6:
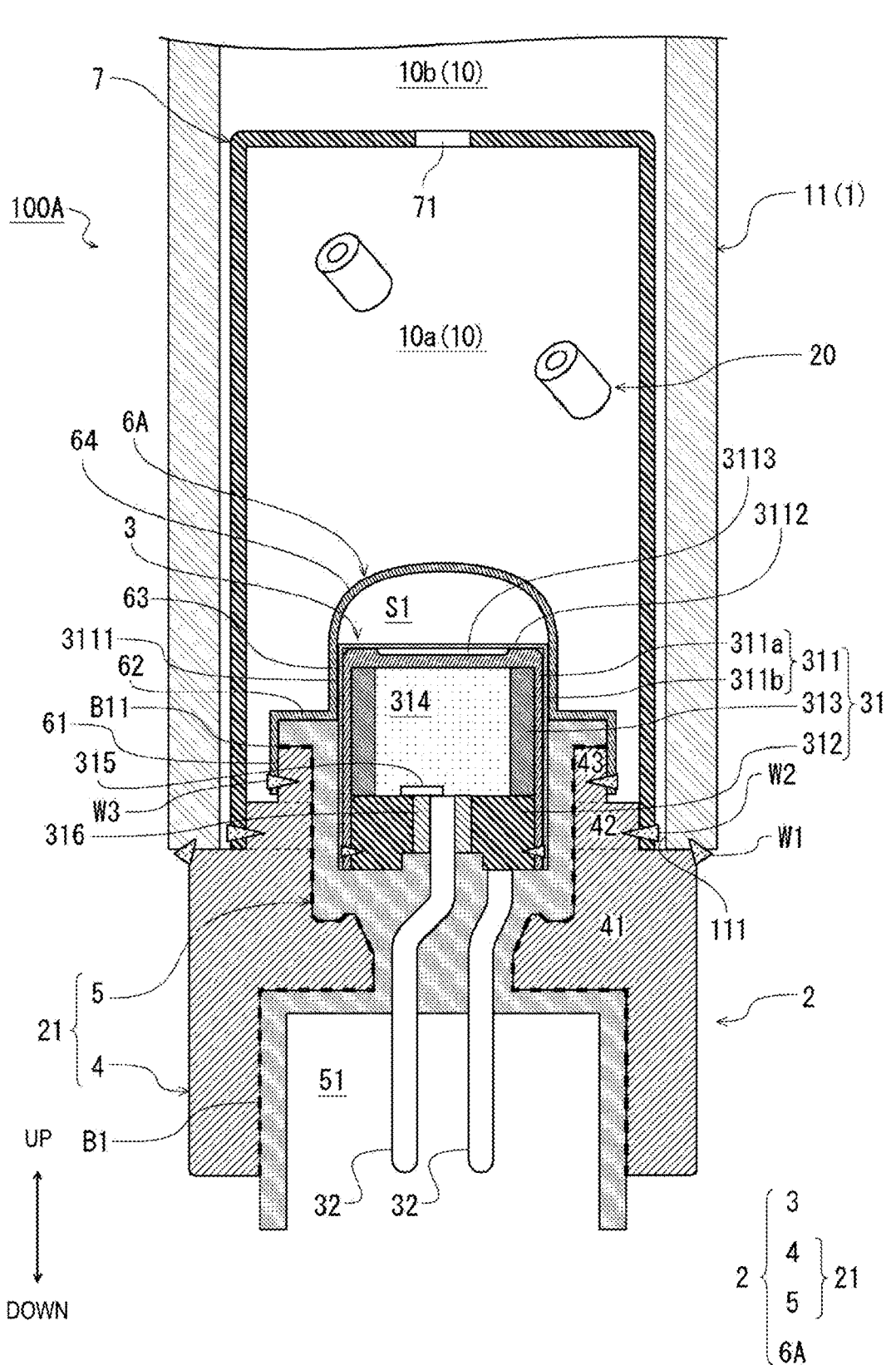
FIG. 6 is a cross-sectional view illustrating a state of a portion near the igniter assembly before actuation of a gas generator according to a first modified example of the first embodiment.
Figure 7:
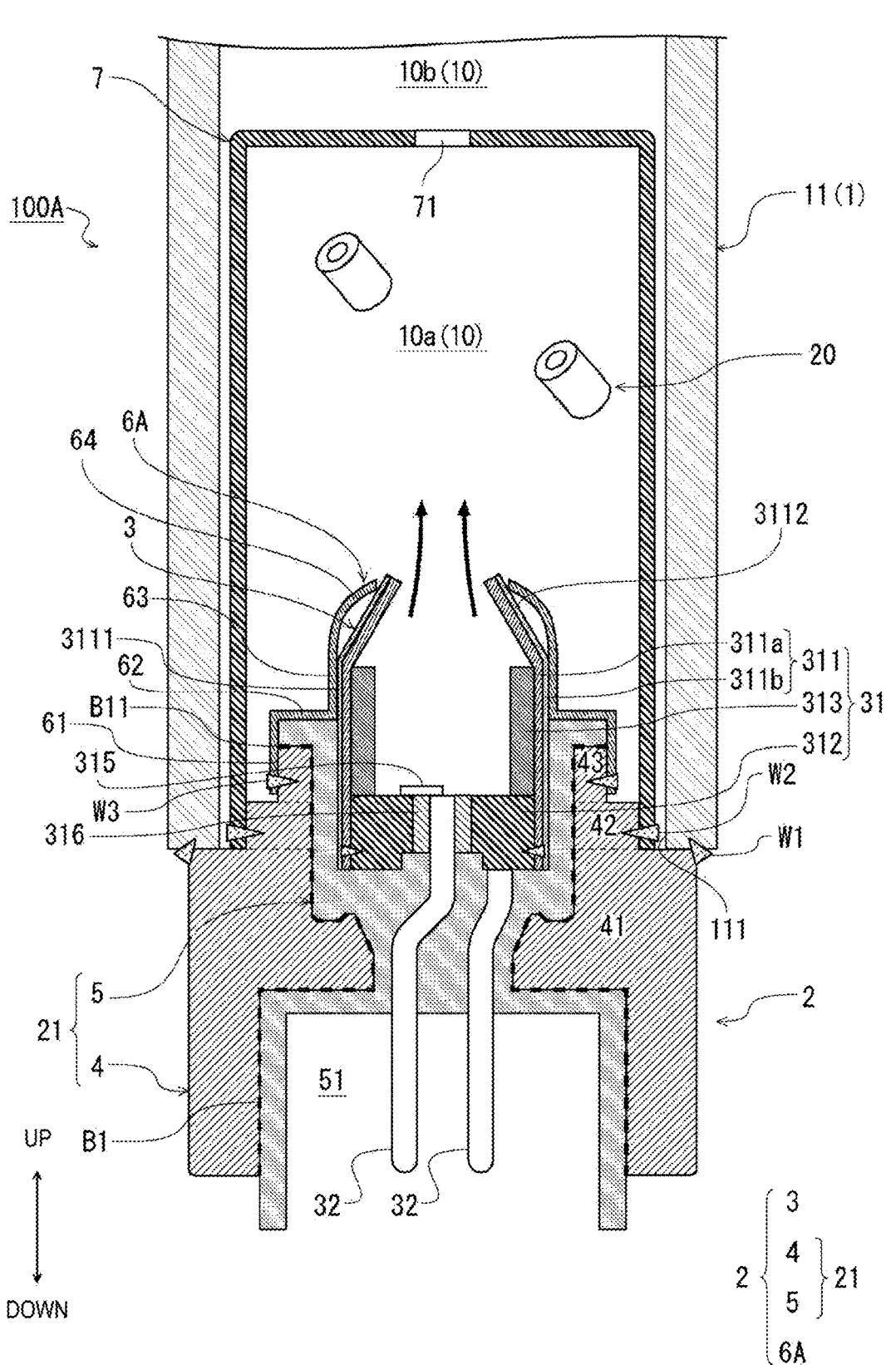
FIG. 7 is a cross-sectional view illustrating a state of a portion near the igniter assembly when the gas generator according to the first modified example of the first embodiment is actuated and a cover member is ruptured.

FIG. 6 is a cross-sectional view illustrating a state of a portion near the igniter assembly 2 before actuation of a gas generator 100A according to a first modified example of the first embodiment. FIG. 7 is a cross-sectional view illustrating a state of a portion near the igniter assembly 2 when the gas generator 100A according to the first modified example of the first embodiment is actuated and a cover member 6A is ruptured. As illustrated in FIG. 7, in the gas generator 100A according to the first modified example of the first embodiment, when the igniter 3 is actuated, the lid wall portion 3112 of the cup body 311 is ruptured and thus comes into contact with the cover member 6A. As illustrated in FIGS. 6 and 7, the cover member 6A according to the first modified example is formed in a manner that a predetermined space S1 is ensured between the cover member 6A and the lid wall portion 3112 before actuation of the igniter 3, and in the meantime, the ruptured piece of the lid wall portion 3112 comes into contact with the cover member 6A when the igniter 3 is actuated. When the igniter 3 is actuated, the ruptured piece of the lid wall portion 3112 of the cup body 311 comes into contact with the cover member 6A, and thus stress is concentrated on the cover member 6A (a portion with which the ruptured piece comes into contact). As a result, the cover member 6A can be easily ruptured.

Second Modified Example

Figure 8:
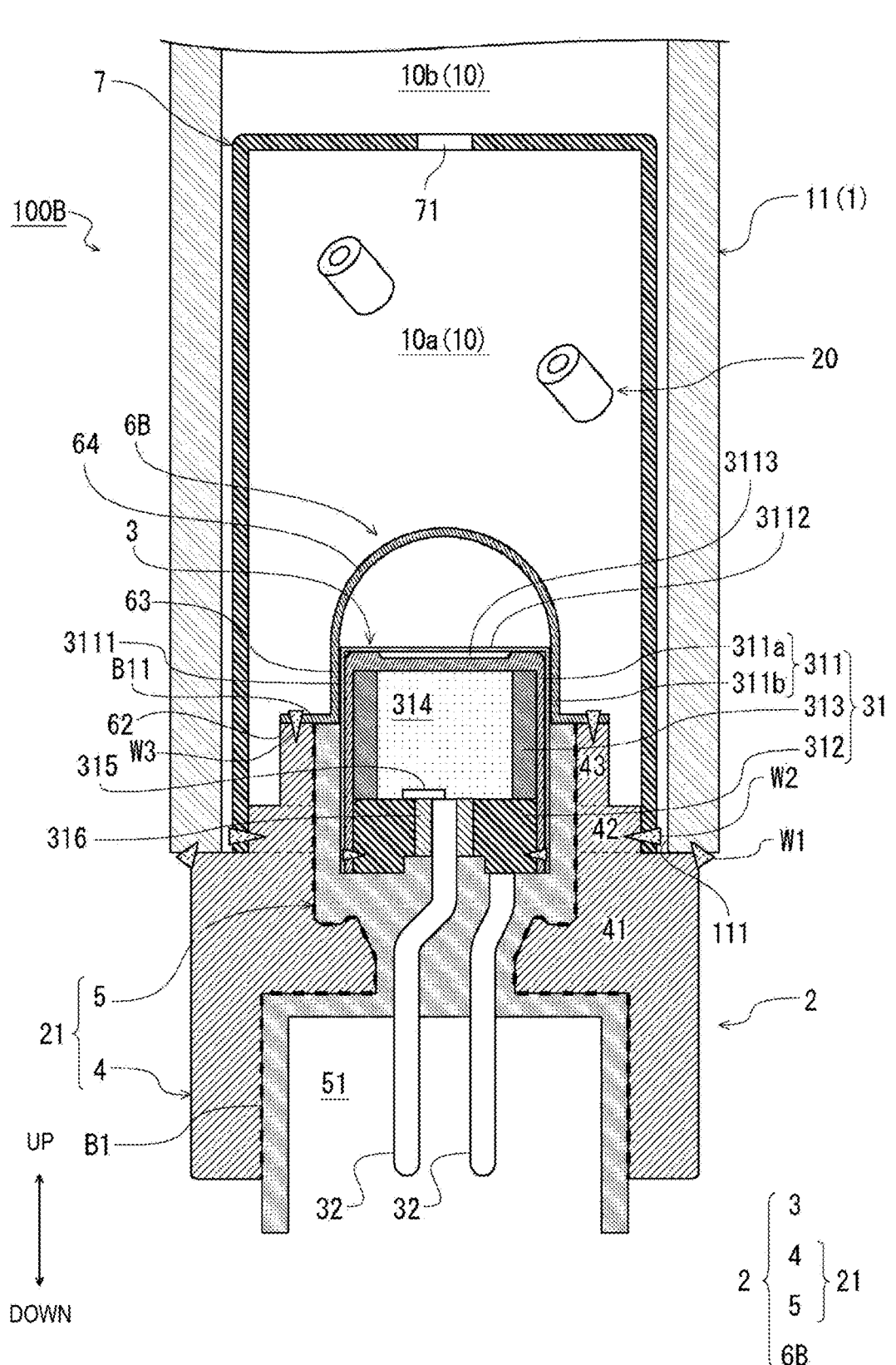
FIG. 8 is a cross-sectional view illustrating a state of a portion near an igniter assembly before actuation of a gas generator according to a second modified example of the first embodiment.

FIG. 8 is a cross-sectional view illustrating a state of a portion near the igniter assembly 2 before actuation of a gas generator 100B according to a second modified example of the first embodiment. As illustrated in FIG. 8, in the gas generator 100B according to the second modified example, the resin member 5 covers the inner peripheral surface of the collar member 4 in a manner that the upper end surface of the resin member 5 is flush with the upper end surface of the third portion 43 of the collar member 4. Therefore, the end portion of the boundary portion B1 between the collar member 4 and the resin member 5, which appears inside the housing 1, is located on an upper end surface of the joined body 21 of the collar member 4 and the resin member 5. A cover member 6B according to the second modified example does not include the aforementioned axially extending portion 61. The radially extending portion 62 of the cover member 6B covers the upper end surface of the third portion 43 of the collar member 4 and the upper end surface of the resin member 5 in a manner that the radially extending portion 62 straddles the boundary line B11 between the collar member 4 and the resin member 5, and is continuously welded to the upper end surface of the third portion 43 over the entire circumference. Also, in the gas generator 100B according to the second modified example as just described, the cover member 6B is welded to the collar member 4 over the entire circumference while straddling the boundary line B11 between the resin member 5 and the collar member 4. Therefore, the airtightness of the accommodating space 10 can be improved.

Second Embodiment

Figure 9:
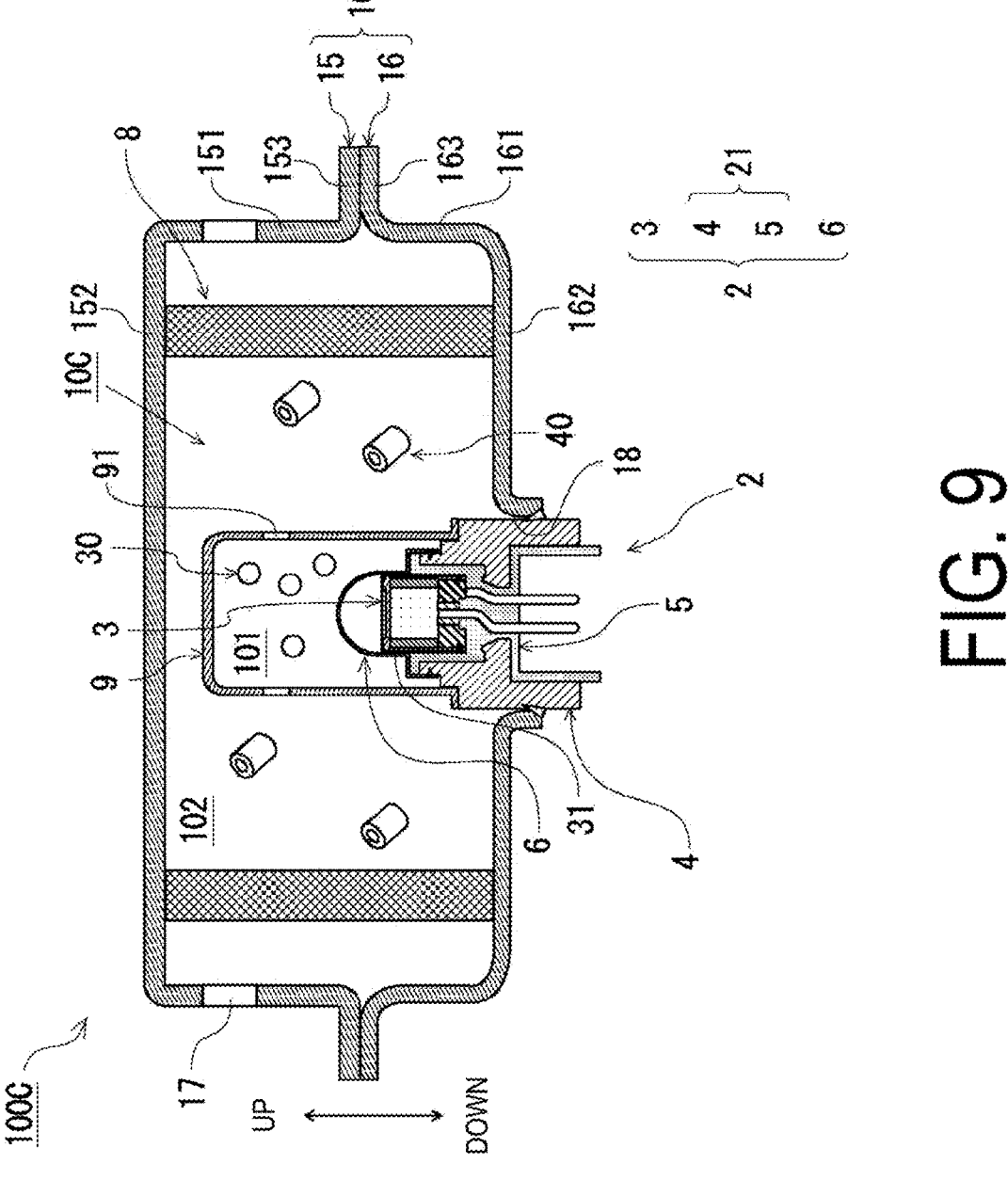
FIG. 9 is a cross-sectional view illustrating a state of a portion near an igniter assembly before actuation of a gas generator according to a second embodiment.

A gas generator 100C according to a second embodiment will be described below. FIG. 9 is a cross-sectional view illustrating a state before actuation of the gas generator 100C according to the second embodiment. FIG. 9 illustrates a cross-section along an axial direction of a housing 1C. The gas generator 100C according to the second embodiment is configured as a so-called pyrotechnic gas generator using only a gas generating agent as a gas source. In the description of the second embodiment, differences from the gas generator 100 according to the first embodiment described with reference to FIGS. 1 to 5 will be mainly described, and detailed descriptions about points similar to those of the gas generator 100 will be omitted.
Configuration As illustrated in FIG. 9, the gas generator 100C according to the second embodiment includes the housing 1C, the igniter assembly 2, a filter 8, and an inner cylindrical member 9. Note that the gas generator 100C according to the second embodiment includes the igniter assembly 2 illustrated in FIG. 2, but the gas generator 100C may include the igniter assembly 2 illustrated in FIG. 8 instead.

As illustrated in FIG. 9, the housing 1C according to the second embodiment is formed in a short cylindrical shape with both ends in an axial direction closed by joining an upper shell 15 and a lower shell 16, each made of metal and formed in a bottomed cylindrical shape, in a state where the opening ends thereof face each other. However, the configuration of the upper shell 15 and the lower shell 16 is not limited thereto, and a known configuration can be appropriately used.

As illustrated in FIG. 9, the upper shell 15 includes an upper cylindrical portion 151 having a cylindrical shape, a top plate portion 152 closing an upper end of the upper cylindrical portion 151, and a joint portion 153 having a flange shape extending radially outward from a lower end portion of the upper cylindrical portion 151. The lower shell 16 includes a lower cylindrical portion 161 having a cylindrical shape, a bottom plate portion 162 closing a lower end of the lower cylindrical portion 161, and a joint portion 163 having a flange shape extending radially outward from an upper end portion of the lower cylindrical portion 161. The joint portion 153 of the upper shell 15 and the joint portion 163 of the lower shell 16 are joined by welding or the like with them overlapping each other, thereby forming the housing 1C.

A plurality of gas discharge ports 17 allowing for communication between the inside and the outside of the housing 1C are formed side by side along a circumferential direction in the upper cylindrical portion 151 of the upper shell 15. The gas discharge ports 17 are closed by a closing member such as a seal tape (not illustrated) before actuation of the gas generator 100C.

An igniter mounting hole 18 to which the igniter assembly 2 is mounted is formed in the bottom plate portion 162 of the lower shell 16. The igniter assembly 2 is attached to the housing 1C by welding the collar member 4 to the housing 1C (more specifically, an inner wall of the igniter mounting hole 18) over the entire circumference in a state where the igniter assembly 2 is inserted into the igniter mounting hole 18 and thus closes the igniter mounting hole 18.

The filter 8 is formed in a cylindrical shape in which multiple ports are formed. As illustrated in FIG. 9, the filter 8 is disposed between the igniter assembly 2 and each of the gas discharge ports 17 in a state in which an upper end portion is supported by the top plate portion 152 of the upper shell 15 and a lower end portion is supported by the bottom plate portion 162 of the lower shell 16. Thus, an accommodating space 10C in which the gas source is stored is formed by the housing 1C, the filter 8, and the igniter assembly 2. More specifically, the accommodating space 10C is formed as a space surrounded by the top plate portion 152 of the upper shell 15, the bottom plate portion 162 of the lower shell 16, the filter 8, and the igniter assembly 2.

As illustrated in FIG. 9, the inner cylindrical member 9 is a bottomed cylindrical member extending in the vertical direction and having an upper end portion which is closed, and is disposed surrounding the igniter assembly 2 mounted in the igniter mounting hole 18. In a state where the collar member 4 of the igniter assembly 2 is fitted into an opening formed in a lower end portion of the inner cylindrical member 9, the collar member 4 and the inner cylindrical member 9 are welded to each other over the entire circumference, whereby the inner cylindrical member 9 is joined to the igniter assembly 2. The accommodating space 10C is divided by the inner cylindrical member 9 into a first combustion chamber 101 inside the inner cylindrical member 9 and a second combustion chamber 102 outside the inner cylindrical member 9. A plurality of communication holes 91 allowing for communication between an internal space (i.e., the first combustion chamber 101) and an external space (i.e., the second combustion chamber 102) are formed in the inner cylindrical member 9. The communication holes 91 are closed by a closing member such as a seal tape (not illustrated) before actuation of the igniter 3.

The first combustion chamber 101 stores a first gas generating agent 30 as a gas source, and the second combustion chamber 102 stores a second gas generating agent 40 as a gas source. The first gas generating agent 30 is burned by operation of the igniter 3 to generate combustion gas. The first gas generating agent 30 functions as a so-called transfer charge for igniting the second gas generating agent 40. The second gas generating agent 40 is ignited by the combustion gas of the first gas generating agent 30 (transfer charge) burned by the operation of the igniter 3, and thus generates combustion gas. For the first gas generating agent 30 and the second gas generating agent 40, one similar to the gas generating agent 20 according to the first embodiment described above can be used. However, the first gas generating agent 30 and the second gas generating agent 40 are not limited to those described above. The first gas generating agent 30 and the second gas generating agent 40 may be gas generating agents of an identical type, an identical shape, and an identical dimension, or may be gas generating agents of different types, different shapes, and different dimensions.

The filter 8 allows the combustion gas to pass therethrough, and the combustion gas is cooled by passing through the filter 8. In this case, the filter 8 filters the combustion gas by collecting combustion residues of the combustion gas.

Operation

Next, the operation of the gas generator 100C according to the second embodiment will be described. Since the operation of the igniter 3 is the same as that of the first embodiment, the description thereof is omitted. When the igniter 3 is actuated, the ignition portion 31 is ruptured and the combustion product of the ignition charge is released. The cover member 6 is ruptured by the combustion product released from the ignition portion 31, and the combustion product is released to the first combustion chamber 101 of the accommodating space 10C. Thus, the first gas generating agent 30 (transfer charge) stored in the first combustion chamber 101 is burned, and combustion gas is generated. The combustion gas of the first gas generating agent 30 breaks the seal tape closing the communication holes 91, and is released through the communication holes 91 to the second combustion chamber 102. Then, the second gas generating agent 40 is ignited by the combustion gas of the first gas generating agent 30, and combustion gas of the second gas generating agent 40 is generated. The combustion gas in the accommodating space 10C is cooled and filtered by passing through the filter 8, then breaks the seal tape closing the gas discharge ports 17, and is released therethrough to the outside of the gas generator 100C. As a result, the airbag is inflated, and an occupant of the vehicle is protected from the impact.

Actions and Effects

Also, in the gas generator 100C according to the second embodiment, effects similar to those of the first embodiment are achieved. In other words, the cover member 6 is welded to the collar member 4 over the entire circumference while straddling the boundary line between the resin member 5 and the collar member 4. Therefore, moisture can be prevented from getting into the accommodating space 10C through the boundary portion between the resin member 5 and the collar member 4 and the boundary portion between the igniter 3 and the resin member 5. As a result, with the gas generator 100C according to the second embodiment, the airtightness of the accommodating space 10C can be improved.

Other

While the embodiments of the technique according to the present disclosure have been described above, each aspect disclosed in the present specification can be combined with any other features disclosed in the present specification. In the embodiments described above, a case where the technique according to the present disclosure is applied to a hybrid gas generator or a pyrotechnic gas generator has been described as an example. However, the technique according to the present disclosure may be applied to a so-called stored gas generator using only pressurized gas as a gas source. For example, the technique according to the present disclosure may be applied to a gas generator that releases gas by rupturing a rupturable plate with a shock wave as disclosed in JP 2003-520153 T.

REFERENCE SIGNS LIST

1 . . . Housing (example of container)
111 . . . Igniter mounting hole
2 . . . Igniter assembly
3 . . . Igniter
4 . . . Collar member
5 . . . Resin member
6 . . . Cover member
10 . . . Accommodating space
20 . . . Gas generating agent (example of gas source)
100 . . . Gas generator

The invention claimed is:

1. A gas generator, comprising:

a housing in which an igniter mounting hole is formed; and an igniter assembly attached to the housing in a manner that the igniter assembly closes the igniter mounting hole, the igniter assembly defining, together with the housing, an accommodating space in which a gas source is stored, the igniter assembly being provided with, an igniter including an ignition portion provided with an ignition chamber in which an ignition charge is stored and a conductive portion to which an ignition current for igniting the ignition charge is supplied, the igniter being disposed in a manner that the ignition portion is located on an inner side of the accommodating space with respect to the conductive portion, the igniter being configured to be actuated by the ignition current supplied to the conductive portion and thus rupture the ignition portion and release a combustion product of the ignition charge;

a collar member made of metal, formed in a cylindrical shape, and inserted into the igniter mounting hole in a manner that the collar member surrounds the igniter;

a resin member made of resin and disposed between the igniter and the collar member, the resin member integrally joining the igniter and the collar member in a state where at least the conductive portion is exposed from the resin member; and a cover member made of metal, the cover member being provided in its entirety within the accommodating space and surrounding the ignition portion and the resin member in a manner that the igniter and the resin member are sealed with respect to the accommodating space, the cover member being configured to be ruptured when the igniter is actuated, the cover member welded to the collar member over an entire circumference while straddling a boundary line between the resin member and the collar member.

2. The gas generator according to claim 1, wherein a gas generating agent and pressurized gas each as the gas source are stored in the accommodating space.

3. The gas generator according to claim 1, wherein the cover member is formed in a manner that a space is ensured between the cover member and a rupturable portion being a portion rupturable in the ignition portion.

4. The gas generator according to claim 3, wherein the ignition portion is provided with a cup body that includes a peripheral wall portion having a cylindrical shape and a lid wall portion closing one end portion of the peripheral wall portion and formed as the rupturable portion; and a closing member disposed closing an opening that is formed in the other end portion of the peripheral wall portion and defining the ignition chamber together with the cup body, the ignition portion being configured to release the combustion product of the ignition charge to the outside of the ignition chamber by rupture of the lid wall portion when the igniter is actuated, and the cover member is provided with a peripheral wall facing portion having a cylindrical shape, the peripheral wall facing portion being disposed in a state of facing the peripheral wall portion and being in contact with the peripheral wall portion, and a lid wall facing portion having a dome shape and formed facing the lid wall portion and protruding toward the accommodating space.

5. The gas generator according to claim 3, wherein the ignition portion is provided with a cup body that includes a peripheral wall portion having a cylindrical shape and a lid wall portion closing one end portion of the peripheral wall portion and formed as the rupturable portion; and a closing member disposed closing an opening that is formed in the other end portion of the peripheral wall portion and defining the ignition chamber together with the cup body, the ignition portion being configured to release the combustion product of the ignition charge by rupture of the lid wall portion when the igniter is actuated, and the ignition portion further includes a charge holder having a cylindrical shape and disposed in the ignition chamber in a manner that the charge holder surrounds the ignition charge while facing the peripheral wall portion and being in contact with the peripheral wall portion.

6. The gas generator according to claim 3, wherein the ignition portion is provided a cup body that includes a peripheral wall portion having a cylindrical shape and a lid wall portion closing one end portion of the peripheral wall portion and formed as the rupturable portion; and a closing member disposed closing an opening that is formed in the other end portion of the peripheral wall portion and defining the ignition chamber together with the cup body, the ignition portion being configured to release the combustion product of the ignition charge by rupture of the lid wall portion when the igniter is actuated, and when the lid wall portion is ruptured and thus the combustion product is intensively released to the cover member, the cover member is ruptured.

7. The gas generator according to claim 3, wherein the ignition portion is provided with a cup body that includes a peripheral wall portion having a cylindrical shape and a lid wall portion closing one end portion of the peripheral wall portion and formed as the rupturable portion; and a closing member disposed closing an opening that is formed in the other end portion of the peripheral wall portion and defining the ignition chamber together with the cup body, the ignition portion being configured to release the combustion product of the ignition charge by rupture of the lid wall portion when the igniter is actuated, and when the lid wall portion is ruptured and thus comes into contact with the cover member, the cover member is ruptured.

8. The gas generator according to claim 3, wherein the ignition portion is provided with a cup that includes a peripheral wall having a cylindrical shape and a first lid closing one end of the peripheral wall and formed as the rupturable portion; and a closure disposed closing an opening that is formed in the other end of the peripheral wall and defining the ignition chamber together with the cup, the ignition portion being configured to release a combustion product of the ignition charge by rupture of the lid when the igniter is actuated, and the ignition portion further includes a charge holder having a cylindrical shape and disposed in the ignition chamber in a manner that the charge holder surrounds the ignition charge while facing the peripheral wall and being in contact with the peripheral wall.

9. The gas generator according to claim 1, wherein the collar member is welded to the housing over an entire circumference.

10. A gas generator, comprising:

a housing defining therein an accommodating space that accommodates therein a gas source; and an igniter assembly attached to the housing, the igniter assembly being provided with, an igniter including an ignition portion provided with an ignition chamber in which an ignition charge is stored and a conductive portion to which an ignition current is supplied, the igniter being disposed in a manner that the ignition portion is located on an inner side of the accommodating space, an igniter collar made of metal, formed in a cylindrical shape, and attached to the housing in a manner that the igniter collar surrounds the igniter;

a resin disposed between the igniter and the igniter collar, and integrally joining the igniter and the igniter collar; and, a cover made of metal, the cover being provided in its entirety within the accommodating space and surrounding the ignition portion and the resin in a manner that the igniter and the resin are sealed with respect to the accommodating space, the cover welded to the igniter collar over an entire circumference while straddling a boundary between the resin and the igniter collar.

11. The gas generator according to claim 10, wherein the cover is formed in a manner that a space is ensured between the cover and a rupturable portion being a portion rupturable in the ignition portion.

12. The gas generator according to claim 11, wherein the ignition portion is provided with a cup that includes a first peripheral wall having a cylindrical shape and a first lid closing one end of the first peripheral wall and formed as the rupturable portion; and a closure disposed closing an opening that is formed in the other end of the first peripheral wall and defining the ignition chamber together with the cup, the ignition portion being configured to release a combustion product of the ignition charge to an outside of the ignition chamber by rupture of the first lid when the igniter is actuated, and the cover member is provided with a second peripheral wall having a cylindrical shape, the second peripheral wall being disposed in a state of facing the first peripheral wall and being in contact with the first peripheral wall, and a second lid having a dome shape and formed facing the first lid and protruding toward the accommodating space.

13. The gas generator according to claim 10, wherein the igniter collar is welded to the housing over an entire circumference.

\*   \*   \*   \*   \*